United States Patent

[11] 3,620,603

| [72] | Inventors | George R. White<br>Rochester, N.Y.;<br>Gordon R. Griffin, Claremont, Calif. |
|---|---|---|
| [21] | Appl. No. | 52,494 |
| [22] | Filed | July 6, 1970 |
| [45] | Patented | Nov. 16, 1971 |
| [73] | Assignee | Xerox Corporation<br>Stamford, Conn. |

[54] OFFCENTER FOCUSING SYSTEM
15 Claims, 4 Drawing Figs.

[52] U.S. Cl............................................. 350/247,
350/96, 350/175 SL, 350/293
[51] Int. Cl............................................. G02b 7/02,
G02b 5/14, G02b 5/10
[50] Field of Search................................. 350/247,
175 SL, 179, 293, 353/69

[56] References Cited
UNITED STATES PATENTS

| 2,354,614 | 7/1944 | Reason | 353/770 |
| 3,016,785 | 1/1962 | Kapany | 350/96 |
| 3,359,849 | 12/1967 | Friedman | 356/153 |
| 3,364,356 | 1/1968 | Jones | 250/203 |
| 3,508,822 | 4/1970 | Cornell et al. | 353/69 |

*Primary Examiner*—David Schonberg
*Assistant Examiner*—Paul A. Sacher
*Attorneys*—John E. Beck, James J. Ralabate, Franklyn C. Weiss and Irving Keschner ABSTRACT: This invention is directed to an offcenter focusing system including a lens which forms a spherical image from an objective plane and with a spherical surface positioned adjacent to the lens so as to receive the spherical image. Focusing in the system of the present invention is accomplished by providing a relative movement between the lens and the spherical surface in a direction away from the common axis of the lens and the spherical surface so as to produce a tilting of the objective plane. The lens may be either refractive or reflective and one example of the invention using a refractive lens is a ball lens in conjunction with a bundle of optically conducting fibers, which bundle forms a spherical surface and with the lens and the bundle of fibers initially on a common axis and with the relative movement off of this common axis to produce a tilting of the objective plane.

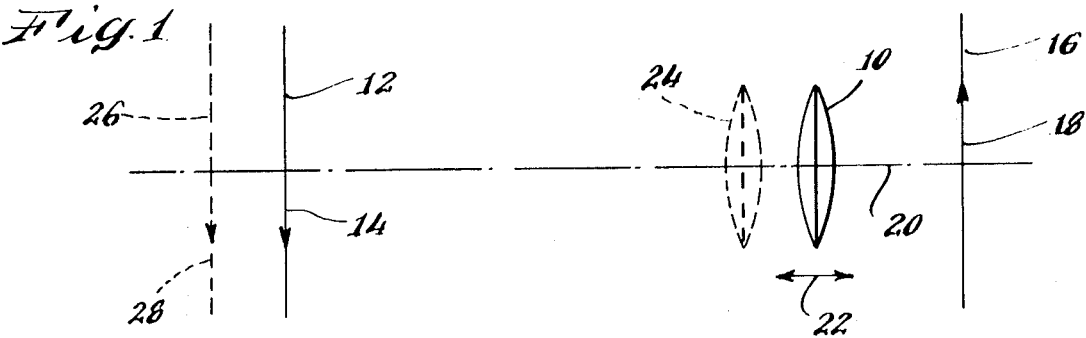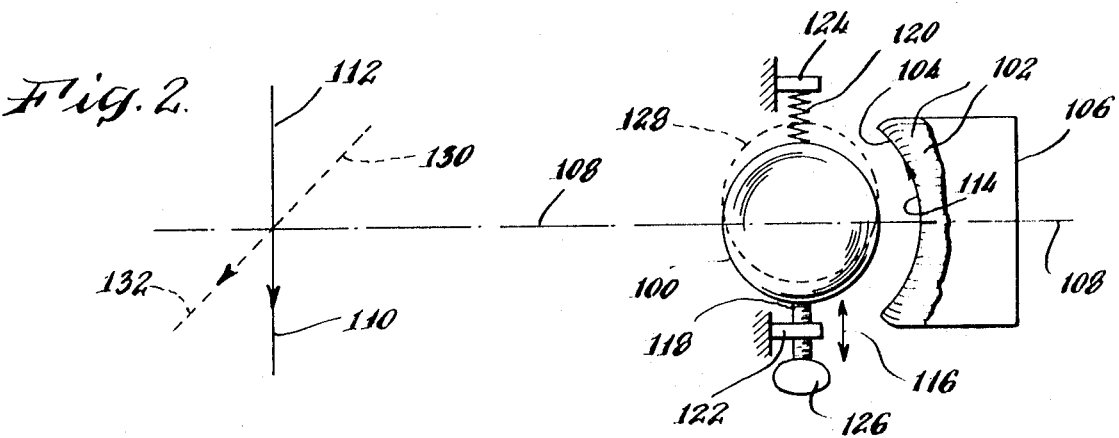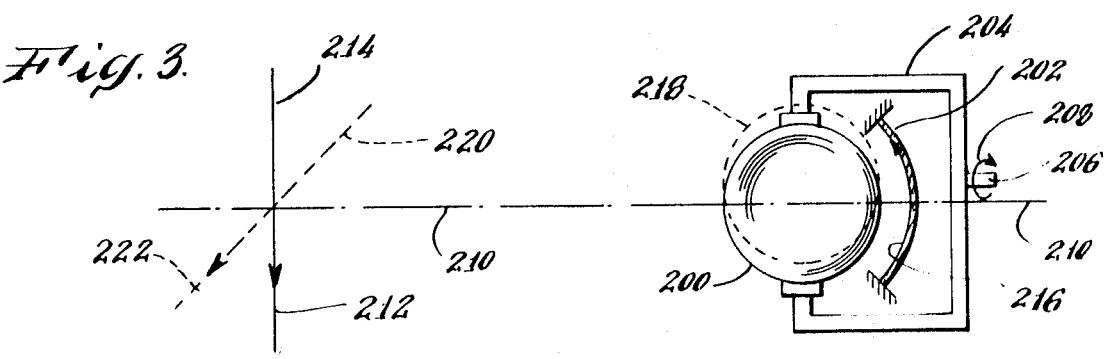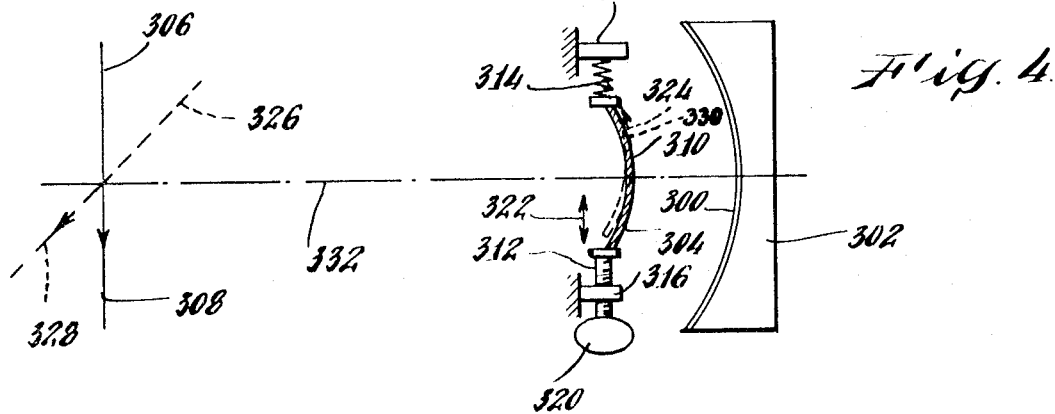

OFFCENTER FOCUSING SYSTEM

The normal method of focusing used in optical systems include a lens and an image surface positioned along a common axis and with the focusing accomplished by the movement of the lens relative to the image surface along the common axis. This type of movement produces a focusing of an objective plane on the image surface and wherein the objective planes focused on the image surface are always parallel to each other. The above-described type of focusing system is used with reflective and refractive optical systems and in optical systems using all types of lenses including ball lenses. The present invention is directed to an offcenter focusing system which produces a tilting of the objective plane focused on the image surface so that some objects close to the lens are in focus while other objects further from the lens are also in focus.

The system of the present invention includes a lens which forms a spherical image of objects in an objective plane. A spherical surface is positioned adjacent to the lens so as to receive this spherical image and wherein the lends and the spherical surface are initially positioned along a common axis. The tilting of the objective plane is produced by providing relative movement between the lens and and the spherical surface wherein the movement is in a direction off of the common axis. For example, the movement may be characterized as a lateral movement between the lens and the spherical surface.

The lens used in the offcenter focusing system of the present invention may be a structure such as a ball lens and one means in which to produce the relative movement is to provide for an offcenter rotation of the ball lens relative to the common axis for the ball lens and the spherical surface. The spherical surface may be constructed of a bundle of optically conducting fibers or the spherical surface may be provided by a photographic film. It is to be appreciated that the invention is not limited to a specific construction of the lens or the spherical surface, but the invention is directed to the unique combination which provides for a tilting of the objective plane.

The offcenter focusing system of the present invention may also be constructed in a reflective optical system wherein a mirror having a first spherical surface serves as the lens and forms a spherical image from an object in objective plane. A second spherical surface is positioned along a common axis with the mirror to receive the spherical image. A relative movement between the mirror and the second spherical surface off of the common axis produces a tilting of the objective plane.

A focusing system such as disclosed in the present application may be used whenever it is desirable to provide for focusing of objects both close and far from the lens system.

A clearer understanding of the invention will be had with reference to the following description and drawings wherein:

FIG. 1 illustrates a prior art system of focusing;

FIG. 2 illustrates a first embodiment of the offcenter focusing system of the present invention incorporating a ball lens and a bundle of optical fibers;

FIG. 3 illustrates a second embodiment of the offcenter focusing system of the present invention incorporating a ball lens and a photographic film; and FIG. 4 illustrates a third embodiment of the offcenter focusing system of the present invention incorporating a mirror formed in a first spherical surface and a second spherical surface formed of a photographic film.

In FIG. 1, a prior art focusing system is shown. In FIG. 1, a lens 10 is used to focus objects in an objective plane. For example, a first position for the objective plane is shown as plane 12, which plane includes objects represented by the arrow 14. The image focused by the lens 10 may be received on a surface such as a screen 16. It is to be appreciated that the screen 16 may be replaced by a photographic film, a bundle of optically conducting fibers, etc. The objects represented by the arrow 14 are reproduced as an image represented by the arrow 18 on the screen 16. Both the lens 10 and the screen 16 are located on a common axis 20.

In order to provide for the focusing of objects in different objective planes other than the plane 12, the lens 10 may be moved along the common axis 20 in the direction as shown by the double arrow 22. For example, assuming the lens is moved to the position shown by the dotted lines 24, the lens now focuses objects located in an objective plane 26. For example, an object such as represented by the arrow 28 may be focused by the lens 24 on the screen 16. It can be seen, therefore, that moving the lens 10 in the direction shown by the arrow 22 provides for a focusing of objects at different distances from the lens on the screen 16.

The lens 10 may be of any type, for example, a ball lens or a spherical mirror surface. If the lens 10 were of such a type such as a ball lens or a spherical mirror surface, the image produced by the lens would be focused along a spherical surface. However, even with the use of a ball lens or a spherical mirror, the focusing schemes of the prior art generally included the movement of the lens in a direction along the common axis, as shown by the double arrow 22.

FIG. 2 illustrates a first embodiment of the offcenter focusing system of the present invention. In FIG. 2, a ball lens 100 produces a spherical image from objects in an objective plane. A spherical surface to receive the spherical image may be constructed of a bundle of optically conducting fibers 102. The use of a bundle of optically conducting fibers 102 is known in the art and the bundle may be used to convert the spherical surface, such as the surface 104, to a plane surface 106. It is also to be appreciated that the ball lens 100 is shown as a single element but that the ball lens may be composed of a plurality of elements in a manner known in the art so as to provide for an improved performance of the ball lens.

Initially, the ball lens 100 and the spherical surface 104, composed of the bundle of fibers 102, are located on a common axis 108. The ball lens 100 focuses objects such as represented by the arrow 110 in an objective plane 112 on the spherical surface 104. The image produced by the ball lens is represented by the arrow 114.

The ball lens 100 could be moved along the common axis 108 to provide for focusing in the same manner as shown by FIG. 1. However, the present invention is directed to an offcenter focusing system which tilts the objective plane. For example, the ball lens 100 may be moved in a direction shown by the double arrow 116 by a screw 118 and a spring 120 which is normally in compression. The ball lens 100 is held between the screw 118 and the spring 120 and the screw 118 is threaded through a net 122 which is fastened to a nonmovable surface and the spring 120 operates against a nonmovable surface 124. A rotation of the screw 118 by a thumbpiece 126 produces movement of the ball lens 100 in the direction shown by the arrow 116.

Assuming that the ball lens 100 is moved in the position shown by the dotted line 128, the ball lens has now been moved laterally with regard to the spherical surface 104 and the ball lens is now located off of the common axis log. When the ball lens is moved laterally, portions of the ball lens represented by the dotted line 128 are closer to the spherical surface 104 than when the ball lens was on the common axis, and other portions of the ball lens represented by the dotted line 128 are further from the spherical surface. The effect of this offcenter movement is to focus an image on the spherical surface 104 from an objective plane which is tilted from the objective plane 112. The new objective plane is represented by the dotted line 130 and, as an example, a particular object 132 would be produced as the image 114.

Movement of the lens 100 in the opposite direction than that shown in FIG. 2 would tilt the objective plane in the opposite direction. It can, therefore, be seen that, depending on the direction of movement of the ball lens 100, the objective plane may be tilted away from the plane 112. It is, therefore, possible to focus different objects, one of which is close to the lens and the other of which is further from the lens, both at the same time, using the focusing system of the present invention.

FIG. 3 illustrates a second embodiment of the invention and includes a ball lens 200 which is positioned adjacent to a spherical surface 202. The spherical surface, for example, may be a photographic film which is used to reproduce the spherical image provided by the ball lens 200. The ball lens 200 is supported by a frame member 204 which rotates about a shaft 206. The rotation of the shaft 206 is designated by the arrow 108. The ball lens 200 and the spherical surface 202 are initially located on a common axis 210 and the ball lens initially focuses an object such as represented by the arrow 212 located in a plane 214. The object represented by the arrow 212 is focused to produce an image represented by the arrow 216 located on the spherical surface 202.

As can be seen in FIG. 3, the shaft 206 is located along a different axis than the axis 210 so that a rotation of the shaft 206 and the frame 204 produces an offcenter rotation of the ball lens 200. It is, therefore, possible to move the ball lens 200 in a lateral direction relative to the spherical surface 202 so that the ball lens 200 is off of the common axis 210.

Assuming that the ball lens 200 has been rotated and that the ball lens is at the position designated by the dotted line 218, the ball lens is now closer to the spherical surface 202 at some positions and further away from the spherical surface 202 at other positions relative to the initial position of the ball lens 200 on the common axis 210. When the ball lens is in the position designated by dotted line 218, the ball lens reproduces objects in an objective plane designated by the dotted line 220. For example, an object designated by the arrow 222 is reproduced as the image 216 on the spherical surface 202. The focusing system of FIG. 3, as with the focusing system of FIG. 2, provides a tilting of the objective plane so that objects both near and far from the lens may be focused at the same time.

Both of the embodiments of the present invention shown in FIGS. 2 and 3 operate with a refractive lens system. The embodiment of FIG. 4 illustrates an offcenter focusing system of the present invention using a reflective optical system. In FIG. 4, a mirror 300 supported by member 302 forms a first spherical surface. The mirror 300 operates as a lens to produce a spherical image. A second spherical surface 304 is positioned relative to the mirror surface 300 to receive the spherical image. The mirror 300 produces an image on the spherical surface 304 from objects in an objective plane such as the objective plane 306. For example, an object represented by the arrow 308 may be reproduced on the spherical surface 304 as the image represented by the arrow 310. The spherical surface 304 is shown as a photographic film but it is to be appreciated that the spherical surface 304 may be formed of a bundle of optically conductive fibers of the same type shown in FIG. 2.

As shown in FIG. 4, the mirror 300 is generally concave and the surface 304 is generally convex. The spherical surface 304 is supported in a holder including a screw 312, a compressive spring 314, a nut 316 through which the screw 312 is threaded, and a holding surface 318 which supports the spring 314. As with the embodiment of FIG. 2, a thumbscrew member 320 may be turned so as to produce movement of the surface 304 in the direction shown by the arrow 322.

Assuming that the surface 304 is moved in the position shown by the dotted line 324, portions of the spherical surface are now closer to the mirror 300 than were previously and portions are further away that were previously. The mirrored surface 300, therefore, produces an image of objects in an objective plane such as objective plane 326, which objective plane 326 is tilted. For example, an object represented by the arrow 328 is produced on the new position of the spherical surface represented by the dotted line 324 as shown by the arrow 330. The objective plane is therefore tilted so that objects both close and far from the lens system may be simultaneously focused.

It can therefore be seen in FIG. 4 that, whereas the spherical surface 304 and the mirror 300 were initially located on a common axis 332, an offcenter or lateral movement of the spherical surface relative to the mirror produced a tilting of the objective lens.

It is to be appreciated that the invention has been described with reference to particular embodiments, but various adaptations, additions and modifications may be made. For example, the ball lens shown in FIGS. 2 and 3 may be composed of a multielement ball lens; also, it is obvious that other image-retaining surfaces such as electronic devices and various types of projection screens may be used in addition to the bundle of fibers and photographic film as shown in this application. Also, it is to be appreciated that the offcenter focusing of the present invention may also be accomplished along with a movement along the common axis so as to provide for a double type of focusing. The present invention, however, requires that at least a portion of the relative movement between the lens and the spherical surface be in a lateral or off-axis direction so as to provide for the tilting of the objective lens. The invention, therefore, is only to be limited to the appended claims.

What is claimed is:

1. An offcenter focusing system, including
   a lens which forms a spherical image from an objective plane,
   a spherical surface positioned adjacent to the lens for receiving the spherical image formed by the lens, and
   means for producing relative movement between the lens and the spherical surface and including at least lateral movement between the lens and the spherical surface to produce a tilting of the objective plane.

2. The offcenter focusing system of claim 1 wherein the lens and the spherical surface form a refractive optical system.

3. The offcenter focusing system of claim 1 wherein the lens and the spherical surface form a reflective optical system.

4. An offcenter focusing system, including
   a ball lens for forming a spherical image,
   a spherical surface positioned adjacent to the ball lens for receiving the spherical image and with the ball lens and the spherical surface initially located on a common axis, and
   means for producing relative lateral movement off the common axis between the ball lens and the spherical surface.

5. The offcenter focusing system of claim 4 wherein the spherical surface is formed of a bundle of optically conducting fibers.

6. The offcenter focusing system of claim 4 wherein the offaxis relative movement is produced by an offcenter rotation of the ball lens.

7. An offcenter focusing system, including
   a mirror having a configuration for forming a spherical image,
   a spherical surface positioned adjacent to the mirror for receiving the spherical image and with the mirror and the spherical surface initially located on a common axis, and
   means for producing relative lateral movement off the common axis between the mirror and the spherical surface.

8. The offcenter focusing system of claim 7 wherein the relative movement is produced by moving the spherical surface.

9. The offcenter focusing system of claim 7 wherein the mirror has a concave spherical configuration and wherein the spherical surface is convex.

10. An offcenter focusing system including
    a lens for forming a focused spherical image of objects in an objective plane,
    a spherical surface positioned adjacent to the lens for receiving the focused spherical image of the objects in the objective plane and with the lens and the spherical surface initially located on a common axis, and
    means for producing a relative lateral movement between the lens and the spherical surface off the common axis to produce a tilting of the objective plane focused on the spherical surface.

11. The offcenter focusing system of claim 10 wherein the lens is a ball lens and wherein the spherical surface is formed from a bundle of optically conducting fibers. X 12. The offcenter focusing system of claim 10 wherein the lens is a ball lens and wherein the relative movement is produced by an offcenter rotation of the ball lens.

13. The offcenter focusing system of claim 12 wherein the lens is a mirror having a spherical surface.

14. The offcenter focusing system of claim 12 wherein the relative movement is produced by a movement of the spherical surface.

15. The offcenter focusing system of claim 12 wherein the relative movement is produced by a movement of the lens.

* * * * *